Dec. 7, 1943.   A. BOOR ET AL   2,335,907
SHOCK ABSORBER
Filed Dec. 30, 1941   2 Sheets-Sheet 1
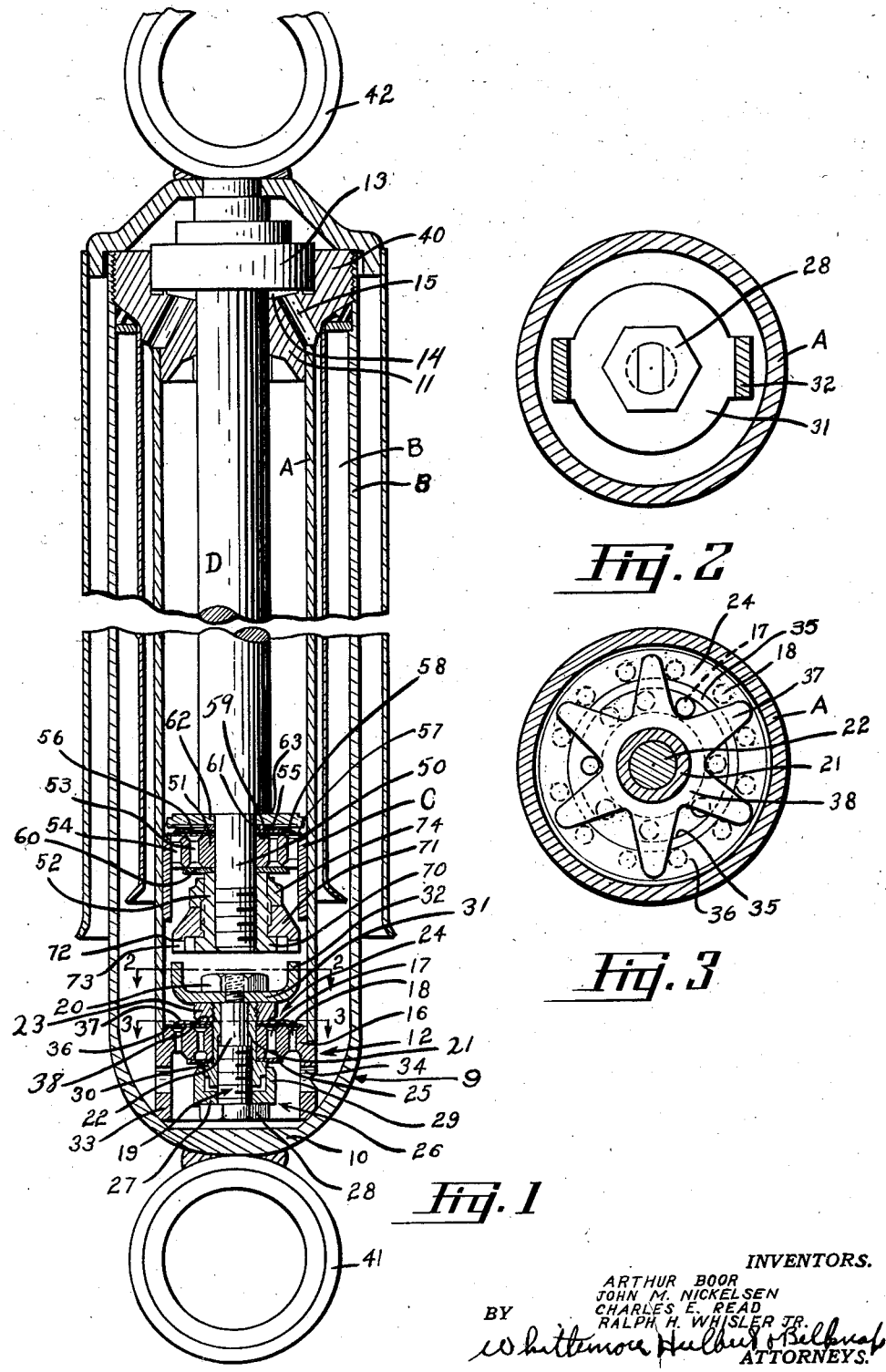
INVENTORS.
ARTHUR BOOR
JOHN M. NICKELSEN
CHARLES E. READ
RALPH H. WHISLER JR.
BY Whittemore Hulbert & Belknap
ATTORNEYS.

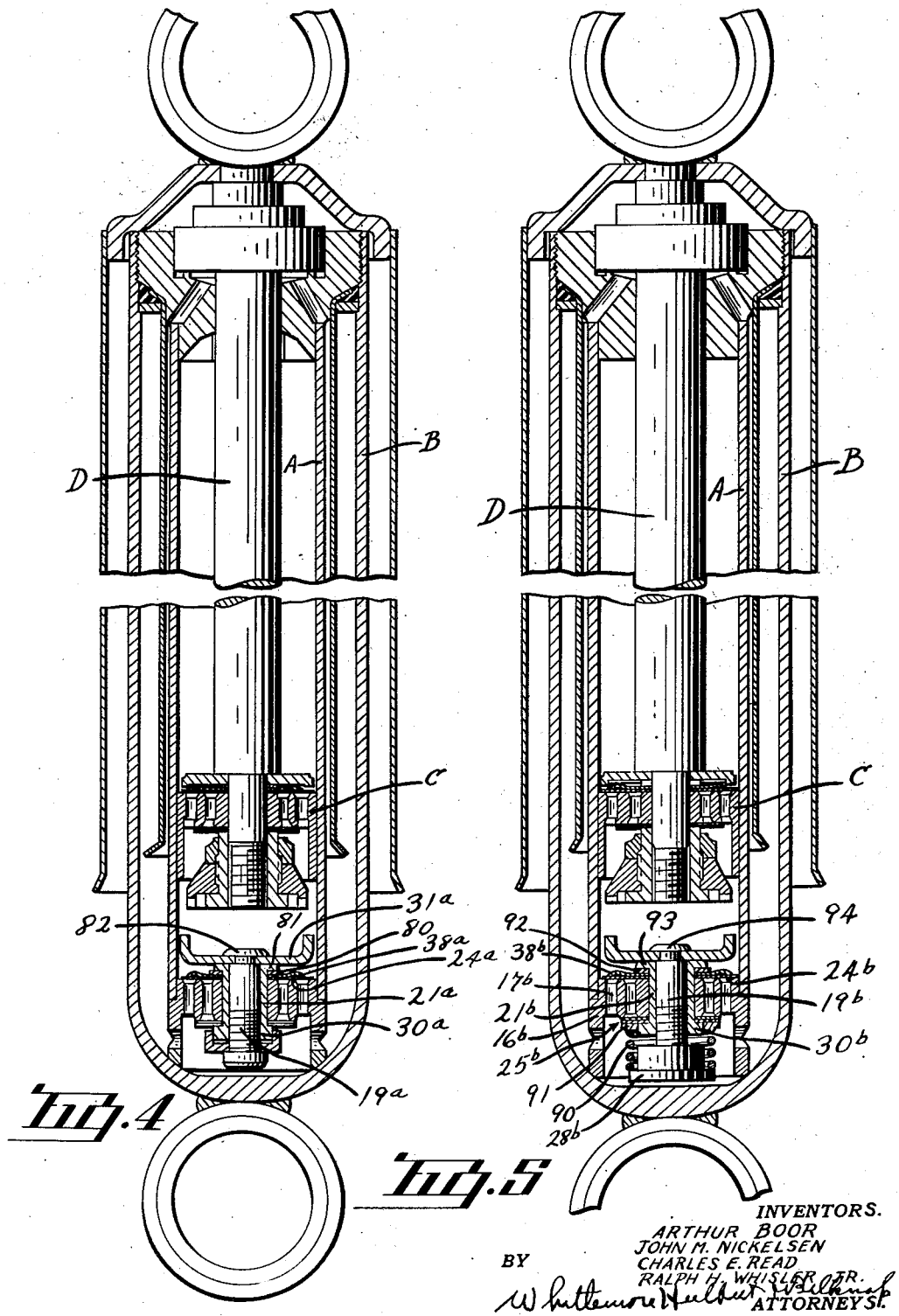

Patented Dec. 7, 1943

2,335,907

UNITED STATES PATENT OFFICE 2,335,907

SHOCK ABSORBER

Arthur Boor, Toledo, Ohio, and John M. Nickelsen, Ann Arbor, and Charles E. Read and Ralph H. Whisler, Jr., Monroe, Mich., assignors to Monroe Auto Equipment Company, Monroe, Mich., a corporation of Michigan Application December 30, 1941, Serial No. 424,966

28 Claims. (Cl. 188—88)

This invention relates generally to shock absorbers and refers more particularly to hydraulic shock absorbers of the direct-acting type.

Heretofore shock absorbers of the type mentioned have been provided with a certain amount of resistance to vehicle spring amplitudes and shock absorber movements, but usually they lacked suitable means for giving increased shock absorber resistance to compensate for increased vehicle spring amplitudes and shock absorber movements. As a result, the shock absorbers mentioned are not capable of being used satisfactorily for heavy or extra heavy duty.

In the present instance, we have overcome the difficulties heretofore encountered by providing the shock absorber with a variable control that is capable of providing the proper resistance to take care of normal shocks and is also capable of providing increased resistance whenever desired to take care of increased spring amplitudes and shock absorber movements. Actually we have provided a control that may be adjusted to vary simultaneously both the compression and rebound actions of the shock absorber. Thus, by making the desired adjustment the shock absorber may be readily adapted for either normal or heavy duty.

In the accompanying drawings:

Figure 1 is a vertical sectional view through a shock absorber embodying our invention;

Figure 2 is a cross sectional view taken substantially on the line 2—2 of Figure 1;

Figure 3 is a cross sectional view taken substantially on the line 3—3 of Figure 1;

Figure 4 is a view similar to Figure 1 but showing a slight modification;

Figure 5 is a view similar to Figure 4 but showing another modification.

Referring now to the drawings, A is the pressure cylinder, B is the reserve chamber, and C is the piston of a hydraulic shock absorber having a variable control embodying our invention.

As shown, the pressure cylinder A is a tubular member and is within and substantially concentric with the cylindrical portion 8 of a casing member 9 above the closed lower end 10 thereof. The casing member 9 cooperates with the cylinder A to provide the reserve chamber B. Preferably this cylinder A has a closure 11 at its upper end apertured to receive a rod D for the piston and has a base valve assembly 12 at its lower end.

The closure 11 has a seal 13 preventing the escape of hydraulic medium along the rod D to the exterior of the shock absorber, a pocket 14 for receiving the hydraulic medium scraped off the rod D by said seal, and passages 15 for conducting such hydraulic medium from the pocket 14 to the reserve chamber B.

The base valve assembly 12 has a body 16 rigid with the lower end of the cylinder A and provided with two circular series of passages 17 and 18, respectively, a bolt 19 extending axially upward through the body 16 and provided at its upper end with a nut 20, a sleeve 21 for the shank 22 of the bolt also extending upward through the body and provided at its upper end with a nut 23, valves 24 and 25, respectively, on the top and bottom of the body controlling the passages 18 and 17, respectively, a cup-shaped slide 26 having the base 27 thereof slidable on the shank 22 of the bolt between the head 28 thereof and the lower end of the sleeve 21 and having its circular part 29 slidable on an annular enlargement or flange 30 of said sleeve toward and away from clamping engagement with the valve 25, and a washer 31 non-rotatably sleeved on the shank 22 of the bolt between the nut 20 and the upper end of the sleeve 21 and having upturned tongues 32 at substantially diametrically opposite points thereof.

Preferably the body 16 has a depending skirt 33 that bears firmly against the closed end 10 of the reserve chamber and is provided intermediate its ends with openings 34 through which the hydraulic medium may flow to and from the reserve chamber B. The sleeve 21 is interiorly threaded at its lower end for engagement with the threads of the bolt shank 22 and is exteriorly threaded at its upper end for engagement with the nut 23. The upper valve 24 is a disk having a curved elongated slot 35 therein registering with the inner series of passages 17 in the body and has an imperforate edge portion 36 that is normally held by the arms 37 of a substantially star-shaped spring 38 in closed position over the outer series of passages 18 in said body. The lower valve 25 is a laminated leaf spring structure and normally closes the lower ends of the inner passages 17 in the body. Thus, the lower valve 25 controls the flow of hydraulic medium through the passages 17 on the compression stroke of the piston C, while the upper valve 24 controls the flow of the hydraulic medium through the passages 18 on the rebound stroke of the piston. The annular enlargement or flange 30 of the sleeve 21 normally serves as the fulcrum for the lower laminated spring valve 25, while the nut 23 serves in that capacity for the upper disk valve 24 and spring 38. Actually the nut 23 cooperates with the enlargement 30 to hold the sleeve 21, body 16 and valves 24 and 25 together as a unit. Thus, when the slide 26 is urged upward by the head 28 of the bolt 19 against the valve 25, the latter will have a wider fulcrum and accordingly will be held in stiffer relation to the underside of the body 16. Consequently, the resistance afforded by the valve 25 to the flow of the hydraulic medium through the passages 17 on the compression stroke of the piston C will be correspondingly greater.

The upper end of the reserve chamber B is mounted on an annular enlargement 40 of the closure 11, and the connection and arrangement of parts are such that the reserve chamber B, closure 11, pressure cylinder A and body 16 are, for all intents and purposes, one rigid unit. The lower closed end 10 of the reserve chamber is rigid with a suitable head 41 for attachment to the unsprung weight of a vehicle, while the outer end of the piston rod D is rigid with a similar head 42 for attachment to the sprung weight of a vehicle.

The piston C is mounted on a reduced lower end portion 50 of the rod D and slidably engages the inner walls of the pressure cylinder A. The head 51 of the piston is held on the rod D by a sleeve 52 threadedly engaging the reduced portion 50 at its lower end, and has two circular series of passages 53 and 54, respectively, therethrough. A valve 55, preferably in the form of a disk having a curved elongated slot 56 registering with the inner series of passages 53 and having an imperforate edge portion 57 normally held by the arms 58 of a substantially star-shaped spring 59 in closed position over the outer series of passages 54, is employed to control the flow of the hydraulic medium through said passages 54 on the compression stroke of the piston, while a laminated leaf spring valve 60 on the underside of the head 51 of the piston normally closes the lower ends of the inner passages 53 and controls the flow of the hydraulic medium through the passages 53 on the rebound stroke of the piston. As shown, the lower valve 60 is clamped between the upper end of the sleeve 52 and the lower side of the head 51, while the valve 55, spring 59 and suitable washers 61 and 62, respectively, are clamped in superposed relation between the upper side of the head 51 and a shoulder 63 of the rod D. Thus, the rod D, sleeve 52, piston C, valves 55 and 60, spring 59 and washers 61 and 62 are, for all intents and purposes, a single unit.

Threadedly engaging the sleeve 52 above a lateral flange 70 at the lower end thereof is a nut 71 having a depending annular flange 72 provided at diametrically opposite points with downwardly opening slots 73 for the reception of the tongues 32 of the washer 31 on the bolt 19, while loosely mounted on the sleeve 52 between the nut 71 and the laminated spring valve 60 is a slide 74. Thus, when the slide 74 is urged upward by the nut 71 against the valve 60, the latter will have a wider fulcrum and accordingly will be held in a stiffer relation to the underside of the head 51 of the piston. Consequently, the resistance afforded by the valve 60 to the flow of the hydraulic medium through the passages 53 on the rebound stroke of the piston C will be correspondingly greater.

To couple together the washer 31 and nut 71, the heads 41 and 42 may be pressed toward each other so that the tongues 32 may enter the slots 73. The desired adjustment of the slides 26 and 74, respectively, relative to the springs 25 and 60 may then be effected by merely turning one unit consisting of the head 41, reserve chamber B, closure 11, pressure cylinder A, and body 16 relative to the other unit consisting of the head 42, rod D, piston C and sleeve 52. When this is done, the bolt 19 will move the slide 26 into clamping engagement with the laminated spring valve 25 and the nut 71 will simultaneously move the slide 74 into clamping engagement with the laminated spring valve 60. Thus, increased resistance for heavy duty is obtained simultaneously for both the compression and rebound strokes of the shock absorber.

In use, when the heads 41 and 42 are moved toward each other the piston C will be on its compression stroke toward the base compression valve assembly 12; hence, the hydraulic medium will flow through the passages 54 in the piston past the valve 55 to the space within the cylinder A above the piston. Likewise, the hydraulic medium will flow through the opening 17 in the body 16 of the base compression valve assembly 12 past the valve 25 to the reserve chamber B.

When the heads 41 and 42 are moved away from each other on the rebound of the shock absorber, the piston C will move toward the closure 11; hence, the hydraulic medium will flow through the passages 53 in the piston past the valve 60 to the space in the cylinder A below the piston. Likewise, the hydraulic medium will flow from the reserve chamber B through the passages 18 in the body 16 of the base compression valve assembly 12 past the valve 24 into the cylinder A. Thus, the valves 55 and 25, respectively, meter and resist the flow of the hydraulic medium as aforesaid during the compression action of the shock absorber, while the valves 60 and 24, respectively, meter and resist the flow of the hydraulic medium as aforesaid during the rebound action of the shock absorber.

The amount of resistance afforded by the valves 25 and 60, respectively, may be varied by the position relative thereto of the slides 26 and 74, respectively. For example, when the slides 26 and 74, respectively, are spaced below the valves 25 and 60, as illustrated in Figure 1, the valves 25 and 60 have only the members 30 and 52, respectively, as fulcrums therefor, hence such valves are substantially pliant. As a result, this arrangement provides the first or low resistance stage. However, when the slides 26 and 74 are engaged with the undersides of the valves 25 and 60, respectively, to supplement and widen the fulcrums 30 and 52, respectively, therefor, then such valves will be held in stiffer relation to the undersides of the body 16 and head 51, respectively, and accordingly will provide greater or increased resistance to the flow as aforesaid of the hydraulic medium. This arrangement provides the second or high resistance stage. Thus, there are two stages of resistance, namely, low and high, for the shock absorber.

When a shock absorber having the resistance stages mentioned is used on an automobile the low stage may be employed during the winter when the hydraulic medium becomes very viscous, while the high stage may be employed during the summer when the hydraulic medium becomes less viscous. The adjustment from summer to winter or vice versa may be accomplished after the shock absorber is on an automobile by first detaching either the head 41 or the head 42 from its supporting bracket on the automobile. For example, if the head 41 is detached then it may be pushed toward the head 42 to cause the tongues 32 of the washer 31 to enter the slots 73 in the nut 71. Then the head 41, casing member 9, cylinder A and body 16 of the base valve assembly 12 are turned as a unit relative to the piston C, rod D and head 42. This causes relative turning movement between the nut 71 and sleeve 52 to vary the position of the slide 74 relative to the valve 60 and causes relative turning movement between the sleeve 21 and shank 22 of the bolt 19 to vary the position of the slide 26 relative to the valve 25.

When the parts are adjusted as described from the low stage position illustrated in Figure 1 to the high stage position, the slide 74 will be moved firmly against the underside of the valve 60 to increase the width of its fulcrum as aforesaid, and the slide 26 will be moved firmly against the underside of the valve 25 to increase the width of its fulcrum. Thus, the valves 60 and 25 will be held in stiffer relation to the undersides of the body 16 and head 51, respectively, and therefore will provide greater or increased resistance to the flow as aforesaid of the hydraulic medium.

Although the shock absorber described herein is primarily adapted for use with a passenger vehicle or automobile, it may be used with a commercial vehicle or truck by simply making the adjustment mentioned from the low to the high resistance stage, as desired. Thus, the adjustment from the low stage resistance to the high stage resistance for summer conditions or for heavy duty vehicles necessarily affects the vehicle spring amplitudes because increased resistance to compression and rebound movements of the shock absorber is provided when the fulcrums for the valves 25 and 60, respectively, are widened as aforesaid to stiffen the action of such valves.

In Figure 4, we have illustrated a slightly different form of base valve assembly wherein the enlargement or flange 30ª of the sleeve 21ª is at the lower end thereof; a washer 80 rests upon the spring 38ª for the valve 24ª; the upper end 81 of the sleeve 21ª is peened over upon said washer 80; and the upper end 82 of the bolt 19ª is peened over upon the coupling washer 31ª. The tongues 32ª of the washer 31ª are engageable with the slots 73 in the nut 71 when the heads 41 and 42 have been urged toward each other. Other than this, the construction and operation of the parts are the same as in Figures 1 to 3, inclusive. For example, when the head 41, casing member 9 and cylinder A are turned as a unit relative to the piston C, rod D and head 42 after the tongues 32ª of the washer 31ª have been engaged with the slots 73 in the nut 71, then relative movement between the nut 71 and sleeve 52 will vary the position of the slide 74 relative to the valve 60, and relative movement between the sleeve 21ª and bolt 19ª will vary the position of the slide 26 relative to the valve 25, as in Figure 1.

In Figure 5, we have illustrated another modification wherein a coil spring 90 is employed to stiffen the resistance afforded by the laminated spring valve 25ᵇ. As shown, the lower end of this spring 90 rests upon the head 28ᵇ of the bolt 19ᵇ, while the upper end of the spring bears against a ring 91 disposed in surface-to-surface engagement with the underside of the laminated spring valve 25ᵇ. The enlargement or flange 30ᵇ of the sleeve 21ᵇ is at the lower end thereof inside the ring 91; a washer 92 rests upon the spring 38ᵇ for the valve 24ᵇ; the upper end 93 of the sleeve 21ᵇ is peened over upon said washer 92; and the upper end 94 of the bolt 19ᵇ is peened over upon the coupling washer 31ᵇ. The tongues 32ᵇ of the washer 31ᵇ are engageable with the slots 73 in the nut 71, as in Figure 1. When the head 41, casing member 9 and cylinder A are turned as a unit relative to the piston C, rod D and head 42 after the tongues 32ᵇ of the washer 31ᵇ have been engaged with the slots 73 in the nut 71, then relative movement between the sleeve 21ᵇ and bolt 19ᵇ will cause the spring 90 to be compressed, and relative movement between the nut 71 and sleeve 52 will vary the position of the slide 74 relative to the valve 60. When the spring 90 is compressed as a result of relative movement between the bolt 19ᵇ and sleeve 21ᵇ as aforesaid, the spring 90 exerts a greater pressure against the laminated spring valve 25ᵇ and thereby stiffens its resistance according to the flow of hydraulic medium through the passages 17ᵇ in the body 16ᵇ on the compression stroke of the piston.

Thus, in each of the three forms illustrated the shock absorber has a variable control that is capable of providing the proper resistance to take care of normal shocks and of providing increased resistance for heavy duty. Likewise, in each instance we have a control that may be adjusted as desired to vary simultaneously both the compression and rebound actions of the shock absorbers.

What we claim as our invention is:

1. A hydraulic shock absorber having cooperating parts capable of both longitudinal and rotary movements relative to each other, one being a pressure cylinder, the other being a piston in said cylinder, means carried by the cylinder for providing a predetermined stage of resistance to the compression action of said parts, means carried by the piston for providing a predetermined stage of resistance to the rebound action of said parts, and adjustable means operable during relative rotary movement of said parts to increase the resistance of both the means aforesaid.

2. A hydraulic shock absorber having cooperating parts capable of both longitudinal and rotary movements relative to each other, one being a pressure cylinder, the other being a piston in said cylinder, means carried by the cylinder for providing a predetermined stage of resistance to the compression action of said parts, means carried by the piston for providing a predetermined stage of resistance to the rebound action of said parts, two adjustable means respectively engageable with the two means aforesaid to increase the resistance provided thereby, and means operable during relative rotary movement between said parts for actuating the two adjustable means.

3. A hydraulic shock absorber having relatively movable parts, one being a pressure cylinder, the other being a piston in said cylinder, means carried by the cylinder for providing a predetermined stage of resistance to the compression action of said parts, means carried by the piston for providing a predetermined stage of resistance to the rebound action of said parts, adjustable means engageable with the first mentioned means aforesaid to stiffen the resistance provided thereby, and adjustable means engageable with the second mentioned means aforesaid to stiffen the resistance provided thereby.

4. A hydraulic shock absorber having cooperating parts capable of both longitudinal and rotary movements relative to each other, one being a pressure cylinder, the other being a piston in said cylinder, means carried by the cylinder for providing a predetermined stage of resistance to the compression action of said parts, means carried by the piston for providing a predetermined stage of resistance to the rebound action of said parts, adjustable means engageable with the first mentioned means aforesaid to stiffen the resistance provided thereby, adjustable means engageable with the second mentioned means aforesaid to stiffen the resistance provided thereby, and means operable during relative rotary movement between said parts for actuating both adjustable means simultaneously.

5. A hydraulic shock absorber having cooperating parts capable of both longitudinal and rotary movements relative to each other, one being a pressure cylinder, the other being a piston in said cylinder, a body carried by the cylinder and having passages through which a hydraulic medium is adapted to flow on the compression stroke of the piston, a laminated spring valve resisting the flow of the medium through said passages, the piston having passages through which the hydraulic medium is adapted to flow on the rebound stroke of the piston, a laminated spring valve resisting the flow of the medium through the last mentioned passages, and means operable during relative rotary movement between said parts for stiffening the resistance provided by both valves aforesaid.

6. A hydraulic shock absorber having cooperating parts capable of both longitudinal and rotary movements relative to each other, one being a pressure cylinder, the other being a piston in said cylinder, a body carried by the cylinder and having passages through which a hydraulic medium is adapted to flow on the compression stroke of the piston, a spring valve resisting the flow of the medium through said passages, the piston having passages through which the hydraulic medium is adapted to flow on the rebound stroke of the piston, a spring valve resisting the flow of the medium through the last mentioned passages, adjustable means for stiffening the resistance of the first mentioned valve, adjustable means for stiffening the resistance of the second mentioned valve, and means operable during relative rotary movement of said parts for actuating both adjustable means.

7. A hydraulic shock absorber having relatively movable parts, means carried by one of said parts for controlling relative movement between said parts, means carried by the other of said parts for controlling relative movement between said parts, and means for adjusting simultaneously the two control means aforesaid.

8. A hydraulic shock absorber having relatively movable parts, each having passages for a hydraulic medium and valves normally closing said passages and providing a predetermined amount of resistance to the flow of the medium therethrough, and means for stiffening simultaneously the action of said valves to provide increased resistance to the flow of the medium through said passages.

9. A hydraulic shock absorber having relatively movable parts, each having passages for a hydraulic medium and valves normally closing said passages and providing a predetermined amount of resistance to the flow of the medium therethrough, adjustable members engageable with said valves to provide icnreased resistance to the flow of the medium through said passages, and means for adjusting both members simultaneously.

10. A hydraulic shock absorber having relatively movable parts, means carried by one of said parts for controlling relative movement between said parts, means carried by the other of said parts for controlling relative movement between said parts, and a normally detached coupling between said parts operable during relative movement thereof to adjust simultaneously the two control means aforesaid.

11. A hydraulic shock absorber having cooperating parts capable of both longitudinal and rotary movements relative to each other, means operable during relative movement of said parts to provide a predetermined amount of resistance to such movement, adjustable means engageable with the means aforesaid to increase the amount of resistance provided thereby, and means operable during relative rotary movement between said parts for actuating the adjustable means.

12. A hydraulic shock absorber having cooperating parts capable of both longitudinal and rotary movements relative to each other, one being a pressure cylinder and the other being a piston in said cylinder, and means for controlling the relative longitudinal movement between said parts including means operable during such movement for providing a predetermined amount of resistance to said movement, adjustable means engageable with the means just mentioned to increase the amount of resistance provided thereby, and means operable during relative rotary movement of said parts for actuating said adjustable means.

13. A hydraulic shock absorber having cooperating parts capable of both longitudinal and rotary movements relative to each other, said parts being movable longitudinally relative to each other during compression and rebound strokes thereof, means operable during the compression stroke for resisting such movement, means operable during the rebound stroke for resisting such movement, and means operable during relative rotary movement of said parts for varying the resistance of the two means aforesaid.

14. A hydraulic shock absorber having cooperating parts capable of both longitudinal and rotary movements relative to each other, one being a pressure cylinder and the other being a piston in said cylinder, the piston having passages therethrough for the hydraulic medium and a valve normally closing said passages and offering a predetermined amount of resistance to the flow of the hydraulic medium therethrough, a body fixed to the cylinder and having passages therethrough for the hydraulic medium and a valve normally closing said passages and offering a predetermined amount of resistance to the flow of the hydraulic medium therethrough, and means operable during relative rotary movement of said parts for increasing simultaneously the resistance offered by both valves.

15. A hydraulic shock absorber having cooperating parts capable of both longitudinal and rotary movements relative to each other, one being a pressure cylinder and the other being a piston in said cylinder, the piston having passages therethrough for the hydraulic medium and a valve normally closing said passages and offering a predetermined amount of resistance to the flow of the hydraulic medium therethrough, a body fixed to the cylinder and having passages therethrough for the hydraulic medium and a valve normally closing said passages and offering a predetermined amount of resistance to the flow of the hydraulic medium therethrough, adjustable means for increasing the resistance offered by said valves, and a normally detached coupling between said parts operable during relative rotary movement thereof to actuate said adjusting means.

16. A hydraulic shock absorber having cooperating parts capable of both longitudinal and rotary movements relative to each other, one being a pressure cylinder and the other being a piston in said cylinder, the piston having passages therethrough for the hydraulic medium and a valve normally closing said passages and offering a predetermined amount of resistance to the flow of the hydraulic medium therethrough, a body fixed to the cylinder and having passages therethrough for the hydraulic medium and a valve normally closing said passages and offering a predetermined amount of resistance to the flow of the hydraulic medium therethrough, adjustable members engageable with said valves to increase the resistance offered thereby, one member for each valve, and means operable during relative rotary movement of said parts to actuate both members simultaneously.

17. In a hydraulic shock absorber, a pressure cylinder, a casing member cooperating with said cylinder to form a reserve chamber, and a valve assembly for controlling the flow of hydraulic medium between the cylinder and chamber, including a body rigid with the lower end of the cylinder and having two sets of openings therethrough for the hydraulic medium, leaf spring valves at the top and bottom of said body for controlling the passage of the hydraulic medium through said openings, the valve at the top of the body controlling one set, the valve at the bottom of the body controlling the other set, and means holding said valves in operative position relative to said openings, including means clamping said valves to said body, a portion of the clamping means being adjustable relative to the body to vary the action of one of said valves.

18. In a hydraulic shock absorber, a pressure cylinder, a casing member cooperating with said cylinder to form a reserve chamber, and a valve assembly for controlling the flow of hydraulic medium between the cylinder and chamber, including a body rigid with the lower end of the cylinder and having two sets of openings therethrough for the hydraulic medium, leaf spring valves at the top and bottom of said body for controlling the passage of the hydraulic medium through said openings, the valve at the top of the body controlling one set, the valve at the bottom of the body controlling the other set, and means for holding said valves in operative position relative to said openings, including an elongated member extending through said body, and elements carried by said elongated member and engaging said valves, one of said elements being adjustable relative to said elongated member.

19. In a hydraulic shock absorber, a pressure cylinder, a casing member cooperating with said cylinder to form a reserve chamber, and a valve assembly for controlling the flow of hydraulic medium between the cylinder and chamber, including a body rigid with the lower end of the cylinder and having two sets of openings therethrough for the hydraulic medium, leaf spring valves at the top and bottom of said body for controlling the passage of the hydraulic medium through said openings, the valve at the top of the body controlling one set, the valve at the bottom of the body controlling the other set, means holding said valves in operative position relative to said openings, including a member extending axially of said body, and means for varying the action of the valve on the bottom of the body, including an element slidable on said axially extending member and adapted to clamp a portion of the valve on the bottom of the body against said bottom of the body.

20. In a hydraulic shock absorber, a pressure cylinder, a piston within said cylinder and having two sets of openings therethrough for a hydraulic medium, leaf spring valves on the top and bottom of said piston for controlling said openings, the valve on the top of the piston controlling one set, the valve on the bottom of the piston controlling the other set, an operating rod for the piston, and means carried by said rod for varying the action of the valve on the bottom of the piston, including an element slidable on the rod to clamp a portion of the valve on the bottom of the piston against said bottom of the piston.

21. In a hydraulic shock absorber, a pressure cylinder, a piston within said cylinder and having two sets of openings therethrough for a hydraulic medium, leaf spring valves on the top and bottom of said piston for controlling said openings, the valve on the top of the piston controlling one set, the valve on the bottom of the piston controlling the other set, an operating rod for the piston, a sleeve on said rod providing a fulcrum for one of said valves, a slide carried by the sleeve and movable relative thereto to widen the fulcrum mentioned to stiffen the action of said valve, and means on the sleeve for moving said slide.

22. In a hydraulic shock absorber, a pressure cylinder, a piston within said cylinder and having two sets of openings therethrough for a hydraulic medium, leaf spring valves on the top and bottom of said piston for controlling said openings, the valve on the top of the piston controlling one set, the valve on the bottom of the piston controlling the other set, an operating rod for the piston, a sleeve on said rod providing a fulcrum for one of said valves, and a slide carried by the sleeve and movable relative thereto to supplement and widen the fulcrum mentioned to stiffen the action of said valve.

23. In a hydraulic shock absorber, a body having a passage therethrough for a hydraulic medium, a leaf spring valve at one end of said passage for controlling the flow of hydraulic medium through said passage, means cooperating with the body to hold the valve in operative position relative to said passage, and means adjustable relative to the means just mentioned to resist the opening movement of said valve relative to said passage.

24. In a hydraulic shock absorber, a body having two sets of openings therethrough for a hydraulic medium, leaf spring valves at the top and bottom of said body for controlling the passage of hydraulic medium through said openings, the valve at the top of the body controlling one set, the valve at the bottom of the body controlling the other set, means holding said valves in operative position relative to said openings including a member extending axially of said body, and means for varying the action of the valve on the bottom of the body, including a member extending axially of and adjustable relative to the axially extending member just mentioned, and an element carried by and adapted to be actuated by the last mentioned axially extending member to clamp a portion of the valve on the bottom of the body against said bottom of the body.

25. In a hydraulic shock absorber, a body having a passage therethrough for a hydraulic medium, a leaf spring valve engaging the body at one end of and normally closing said passage, means clamping one portion of said valve against said body to resist opening movement of the valve relative to the passage, and means adjustable relative to the means just mentioned to clamp another portion of the valve against the body to further resist opening movement of the valve relative to said passage.

26. A hydraulic shock absorber having cooperating parts capable of both longitudinal and rotary movements relative to each other, one being a pressure cylinder and the other a piston in said cylinder, the piston having a set of passages therethrough for a hydraulic medium, a valve resisting the flow of hydraulic medium through said passages, a fixed body at one end of the cylinder having a set of passages therethrough for hydraulic medium, a valve resisting the flow of hydraulic medium through the last mentioned passages, adjustable means engageable with the first mentioned valve to stiffen the resistance provided thereby, adjustable means engageable with the second mentioned valve to stiffen the resistance provided thereby, and normally uncoupled elements adapted to be coupled during relative longitudinal movement between the pressure cylinder and piston and operable during relative rotary movement between said pressure cylinder and piston to actuate the two adjustable means aforesaid.

27. A hydraulic shock absorber having cooperating parts capable of both longitudinal and rotary movements relative to each other, one being a pressure cylinder and the other a piston in said cylinder, the piston having a set of passages therethrough for a hydraulic medium, a valve resisting the flow of hydraulic medium through said passages, a fixed body at one end of the cylinder having a set of passages therethrough for hydraulic medium, a valve resisting the flow of hydraulic medium through the last mentioned passages, adjustable means engageable with the first mentioned valve to stiffen the resistance provided thereby, adjustable means engageable with the second mentioned valve to stiffen the resistance provided thereby, and means operable during relative rotary movement between the pressure cylinder and piston for actuating the two adjustable means aforesaid.

28. A hydraulic shock absorber having cooperating parts capable of both longitudinal and rotary movement relative to each other, one being a pressure cylinder and the other a piston in said cylinder, the piston having a passage therethrough for a hydraulic medium, a valve resisting the flow of hydraulic medium through said passage, a body at one end of the cylinder having a passage therethrough for hydraulic medium, a valve resisting the flow of hydraulic medium through the last mentioned passage, adjustable means engageable with the first mentioned valve to vary the resistance provided thereby, adjustable means engageable with the second mentioned valve to vary the resistance provided thereby, and normally uncoupled elements carried respectively by said piston and cylinder adapted to be coupled during relative longitudinal movement between the cylinder and piston and operable during relative rotary movement between said cylinder and piston while said elements are coupled to actuate the two adjustable means aforesaid.

ARTHUR BOOR.
JOHN M. NICKELSEN.
CHARLES E. READ.
RALPH H. WHISLER, Jr.